(12) United States Patent
LaForge et al.

(10) Patent No.: US 8,954,225 B2
(45) Date of Patent: Feb. 10, 2015

(54) REMOTE MONITORING OF A PLURALITY OF VEHICLES

(75) Inventors: Seth LaForge, Mountain View, CA (US); Jon Wagner, Belmont, CA (US)

(73) Assignee: Mission Motor Company, San Francisco, CA (US)

( * ) Notice: Subject to any disclaimer, the term of this patent is extended or adjusted under 35 U.S.C. 154(b) by 720 days.

(21) Appl. No.: 13/092,659

(22) Filed: Apr. 22, 2011

(65) Prior Publication Data

US 2011/0264318 A1 Oct. 27, 2011

Related U.S. Application Data

(60) Provisional application No. 61/327,069, filed on Apr. 22, 2010.

(51) Int. Cl.
| | |
|---|---|
| *G01M 17/00* | (2006.01) |
| *B60Q 1/00* | (2006.01) |
| *H04W 24/00* | (2009.01) |
| *G07C 5/00* | (2006.01) |
| *G07C 5/08* | (2006.01) |

(52) U.S. Cl.
CPC ............... *G07C 5/008* (2013.01); *G07C 5/085* (2013.01)
USPC ....... 701/33.4; 701/32.2; 701/34.2; 701/34.3; 701/34.4; 340/438; 455/424

(58) Field of Classification Search
USPC .............. 701/32.2–33.4, 34.2–34.4; 340/438; 455/424
See application file for complete search history.

(56) References Cited

U.S. PATENT DOCUMENTS

| | | | | |
|---|---|---|---|---|
| 7,117,075 | B1* | 10/2006 | Larschan et al. ............. | 701/29.6 |
| 7,421,321 | B2* | 9/2008 | Breed et al. .................. | 701/33.6 |
| 7,555,378 | B2* | 6/2009 | Larschan et al. ............. | 701/32.5 |
| 2004/0243285 | A1* | 12/2004 | Gounder ........................... | 701/1 |
| 2006/0052918 | A1* | 3/2006 | McLeod et al. .................. | 701/29 |
| 2006/0095175 | A1* | 5/2006 | deWaal et al. ................... | 701/33 |
| 2008/0147266 | A1* | 6/2008 | Plante et al. .................... | 701/35 |
| 2009/0143935 | A1* | 6/2009 | Hsu ................................. | 701/33 |
| 2010/0131642 | A1* | 5/2010 | Chalikouras et al. .......... | 709/224 |
| 2010/0185356 | A1* | 7/2010 | Haas et al. ...................... | 701/33 |
| 2011/0029188 | A1* | 2/2011 | Hyde et al. ..................... | 701/33 |
| 2011/0224841 | A1* | 9/2011 | Profitt-Brown et al. .......... | 701/2 |

\* cited by examiner

*Primary Examiner* — James Trammell
*Assistant Examiner* — Majdi Alsomiri
(74) *Attorney, Agent, or Firm* — Jeffrey Schox; Diana Lin

(57) ABSTRACT

A method for remotely monitoring and gathering information about a plurality of vehicles, including the steps of accessing the plurality of vehicles wherein each vehicle is individually operated, selecting vehicle data from the plurality of vehicles, communicating the vehicle data from the plurality of vehicles to a remote processor, and processing the plurality of vehicle data into population data by the remote processor. The individual operation of each vehicle preferably includes the steps of generating vehicle data, operating the vehicle based on the vehicle data with a vehicle controller, and storing the vehicle data in a database located on the vehicle.

28 Claims, 4 Drawing Sheets

REMOTE MONITORING OF A PLURALITY OF VEHICLES

CROSS-REFERENCE TO RELATED APPLICATIONS

This application claims the benefit of U.S. Provisional Application No. 61/327,069, filed 22 Apr. 2010, which is incorporated in its entirety by this reference.

TECHNICAL FIELD

This invention relates generally to the vehicle field, and more specifically to a new and useful system and method for remotely monitoring a plurality of vehicles.

BACKGROUND

Recently, there has been an increasing interest in vehicles incorporating battery packs with secondary, rechargeable cells, and in vehicles incorporating electric motors. Unfortunately, these vehicles and their constituent components, including battery packs, electric motors, and cooling systems, are technologies that are still rapidly developing. Thus, there exists an opportunity for vehicle, battery pack, electric motor, and supporting technology developers to monitor and gather information from the vehicles already deployed in the market for use in future development. However, while current monitoring paradigms are capable of monitoring different aspects of the vehicle, access to this information tends to be difficult because the data is generally localized on the vehicle, and is not remotely accessible. Other monitoring paradigms, such as OnStar, only monitor for basic trigger events (e.g. the deployment of an airbag), and do not offer enough information to provide adequate insight as to the state, health, operation and use of the vehicle and its components. Thus, there is a need in the vehicle field to create a new and useful system and method for remotely monitoring a plurality of vehicles.

DESCRIPTION OF THE PREFERRED EMBODIMENTS

The following description of the preferred embodiments of the invention is not intended to limit the invention to these preferred embodiments, but rather to enable any person skilled in the art to make and use this invention.

System for Monitoring a Plurality of Vehicles

Figure 1:
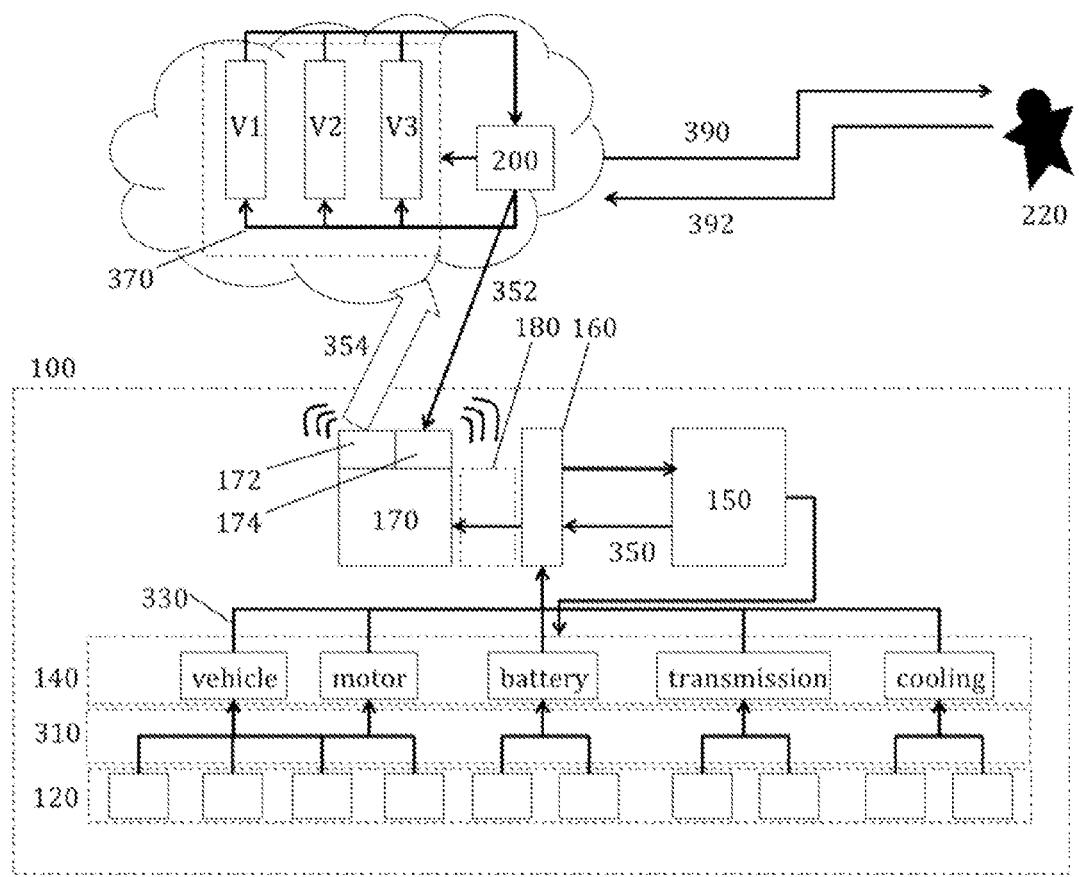
FIG. 1 is a schematic representation of the system used to monitor and gather information from a vehicle.

As shown in FIG. 1, the system 100 for remotely monitoring and gathering information from a vehicle comprises a sensor 120 that measures a series of operation measurements 310 for a operation parameter, a module 140 coupled to the sensor 120 that processes the operation measurements 310 into module data 330 and manages operation parameters based on the module data 330, a vehicle controller module 150 that processes the module data 330 into vehicle data 350 and manages the interaction between multiple modules 140, a data storage 160 that stores the vehicle data 350, a data extraction module 170 that receives extraction instructions 352 from a remote processor 200, extracts data from the data storage 160 based on the extraction instructions 352, and sends the extracted data 354 to the remote processor 200, and an isolation mechanism 180 that separates the data extraction module 170 from the vehicle controller module 150 such that the instructions received by the data extraction module 170 do not affect the operation of the vehicle operation module 140. The processes of the system 100 are preferably performed on a local processor located on the vehicle, but may alternately be performed by separate processors located on the vehicle. The system 100 is preferably utilized with a remote processor 200 remotely located from the vehicle, wherein the remote processor 200 preferably communicates with the system 100 by establishing a communication connection that allows both the system 100 and remote processor 200 to send and receive information. This communication connection is preferably a wireless connection, such as WiFi, satellite, Bluetooth, etc., but may alternately be a wired connection such as a LAN line.

The system 100 preferably reduces the memory requirement for data storage 160 at each successive operational level, storing and transmitting the condensed data instead of raw data. This serves to overcome the issues arising from limited on-vehicle data storage 160 as well as limited data transfer capabilities. The system 100 preferably processes raw data (i.e. operation parameter measurements 310), useful for vehicle operation but not necessarily for vehicle analysis, into summary data (i.e. module data 330, and vehicle data 350) that is more desirable for vehicle and component analysis and monitoring. While the system 100 preferably generates the operation parameter measurements 310, module data 330, and vehicle data 350, the remote processor 200 preferably performs the more computational- and memory-intensive analysis, generating vehicle trend data 370 and population data 390. Data is preferably processed from one form to another through a comparison or a calculation. Examples of comparisons include graphs over time, graphs comparing two data sets, cause-and-effect charts, whether a binary condition is met (e.g. whether the second gear is engaged or whether the motor temperature has reached a predetermined threshold). Examples of calculations include averages over time, the standard deviation of a data set, proximity of a value to a predetermined threshold, generation of characterizing numbers (e.g. the state of charge, viscosity, Reynolds number, Kalmann filter parameters, estimated cell capacity), and values derived from comparisons, such as trend data and the number of times a binary condition is met (e.g. number of times the second gear is engaged).

Operation parameter measurements 310 preferably include instantaneous measurements of operation parameters indicative of vehicle or component state of operation, health, environment, or any other parameter that affects the performance or lifespan of a vehicle or component. These parameters are preferably measurements of a variable and preferably include a numerical value, but may alternately be a record of the state or position of a component. Examples of operation parameter measurements 310 include charging rate, charging state, output current, voltage, power, and impedance with respect to the battery; power consumption, temperature, acceleration, speed, requested torque, produced torque, and motor phase current with respect to the motor; gear position and throttle position with respect to the transmission; cooling fin position, fan speed, fan power level, vehicle temperature, coolant level, and coolant viscosity with respect to the cooling system; brake position, external temperature, acceleration, vibration frequency, vibration amplitude, vehicle location (e.g. longitude and latitude, GPS location, or triangulated position), and drive mode with respect to the general vehicle; and CPU load, memory used, and storage used with respect to the main vehicle computer/processor. However, any other suitable operation parameter may be measured and recorded. Operation parameter measurements 310 are preferably taken frequently, on the rate of several samples per second (e.g. 1 sample/second, 10 samples/second, 100 samples/second, 1000 samples/second) and are preferably taken automatically, but may alternately be taken at any suitable rate and when an operating module requests the data.

Module data 330, which is preferably derived from the operation parameter measurements 310 and, more preferably, from a series of operation parameter measurements 310 recorded over a given period of time, functions to summarize the operation parameter measurements 310 in a manner that describes the state and health of a vehicle subsystem 100 or component. Module data 330 is preferably used by the module 140 to manage vehicle sub-operation. Each piece of module data 330 is preferably derived from measurements of a single operation parameter over a short period of time, but may alternately derived from measurements of multiple operation parameters. While the operation parameter measurements 310 are preferably processed through a calculation or comparison into module data 330, the module data 330 may simply include the unprocessed operation parameter measurements 310. Examples of module data 330 include the average load on the battery (derived from current measurements), or the power output of the battery (derived from current and voltage measurements). Other examples of module data 330 include state of charge and battery capacity with respect to the battery; the average temperature and motor controller internal state with respect to the motor; the number of times the second gear was reached and the average throttle position with respect to the transmission; and the average fan power and average internal temperature with respect to the cooling system. However, any other suitable module data 330 may be derived for the vehicle and its components. Module data 330 is preferably generated semi-frequently, on the order of minutes or hours (e.g. 1 sample/minute, 10 samples/minute, 100 samples/minute, 1000 samples/minute, 1 sample/hour, 10 samples/hour, etc.), and are preferably generated automatically, but may alternately be generated in response to a predetermined condition being met or to instructions sent to the module 140 by the vehicle controller module 150.

Vehicle data 350, which is preferably derived from the module data 330, functions to summarize the module data 330 in a manner that describes the state and health of the vehicle. Additionally, the vehicle data 350 is preferably used by the vehicle controller module 150 to manage the modules 140 of the system 100. Each piece of vehicle data 350 is preferably derived from multiple pieces of module data 330 describing different modules 140, but may alternately be derived from module data 330 describing a single module 140. The module data 330 is preferably processed through a calculation or comparison into vehicle data 350, but may alternately be unprocessed module data 330. While module data 330 preferably summarizes short-term data, vehicle data 350 preferably summarizes both short-term data and data over a longer time period (e.g. over a day or month vs. over several minutes or hours). Examples of vehicle data 350 include the state of charge, the rate of charge depletion, a graph of the battery charge over time, and the overall health of the battery and the motor operational state (e.g. on/off) over time. However, any other suitable vehicle data 350 may be derived for the vehicle and its components. Vehicle data 350 is preferably generated semi-frequently, on the order of minutes or hours (e.g. 1 sample/minute, 10 samples/minute, 100 samples/minute, 1000 samples/minute, 1 sample/hour, 10 samples/hour, etc.), and is preferably generated automatically, but may alternately be generated in response to a predetermined condition being met (e.g. a power surge is detected).

Vehicle trend data 370, which is preferably derived from the vehicle data 350, functions to summarize the state, health, or use of the vehicle and its components over an extended period of time for a single vehicle. Additionally, vehicle trend data 370 may be used to detect anomalies in vehicle or component operation (e.g. excessively high motor temperature or abnormal power output for a given throttle position). Each piece of vehicle trend data 370 is preferably derived from a combination of different vehicle data 350 types, but may alternately be derived from a single vehicle data 350 type. The vehicle data 350 is preferably processed into vehicle trend data 370 through a calculation or a comparison, but may alternately comprise unprocessed vehicle data 350. Examples of vehicle trend data 370 include average power output for the battery over an extended period of time (e.g. over several days, weeks, or months), a graph of the battery power output over time, a graph of the battery demand over time, average motor power output with respect to a given throttle position, etc. However, any other suitable vehicle trend data 370 may be derived for the vehicle and its components. Vehicle trend data 370 is preferably generated semi-frequently, on the order of minutes or hours (e.g. 1 sample/minute, 10 samples/minute, 100 samples/minute, 1000 samples/minute, 1 sample/hour, 10 samples/hour, etc.), and is preferably generated automatically, but may alternately be generated in response to a predetermined condition being met (e.g. abnormal power output, relative to past power output levels, is detected).

Population data 390, which is preferably derived from the vehicle trend data 370, functions to summarize vehicle trend data 370 over multiple vehicles. Population data 390 is preferably used to describe the average performance of the vehicle or a component over time, but may also be used to describe the average use habits of the vehicle or component by the users. Each piece of population data 390 is preferably derived from a combination of different vehicle trend data 370 types, but may alternately be derived from a single vehicle trend data 370 type. The vehicle trend data 370 is preferably processed into population data 390 through a calculation or a comparison, but may alternately comprise unprocessed vehicle trend data 370. Examples of population data 390 include the a graph of the average population battery performance over time, the gear most commonly used by the users, a graph of the average motor performance for a plurality of vehicles, etc. However, any other suitable population data 390 may be derived for a plurality of vehicles and their components. Population data 390 is preferably generated semi-frequently, on the order of minutes or hours (e.g. 1 sample/minute, 10 samples/minute, 100 samples/minute, 1000 samples/minute, 1 sample/hour, 10 samples/hour, etc.), and is preferably generated automatically, but may alternately be generated in response to a predetermined condition being met (e.g. the temperature in a certain location has reached a predetermined temperature, so motor and battery information is collected for all vehicles in the location).

Portions of vehicle data 350 are preferably extracted by the data extraction module 170 and sent to the remote processor 200 based on a set of extraction instructions 352. The extraction instructions 352 preferably describe the portion of data desired, including the data type (e.g. the pieces of vehicle data 350 desired, such as the average motor speed or whether maximum battery power output was reached, or the pieces of module data 330 desired) and the amount of each data type desired (e.g. the number of measurements or the data collected in a given period of time). The extraction instructions 352 may additionally include the rate at which the data is to be extracted and sent to the remote server, the processing steps that should be performed before sending to the remote server, and the amount and/or type of compression that should be applied to the outgoing data. The extraction instructions 352 may alternately be a program that is executed by the data extraction module 170, such as a crawler program or a search program.

The extracted vehicle data 350, vehicle trend data 370, and population data 390 are preferably accessible by third parties 220. For example, the data may be used by an engineer during maintenance or future development. The third party 220 may also be the user who desires to review vehicle usage data, for example, the vehicle may be an electric vehicle and the user may want to access data regarding the performance of the vehicle. This may be particularly useful for a user that utilizes the electrical vehicle in high performance situations such as racing or vehicle time trials, where the user may want to analyze the type of inputs they provided at certain portions of the racetrack, how the vehicle performed when certain user inputs were provided, and/or any other suitable performance data. The third party 220 may also be another processor that is coupled to the remote system through a network. The data is preferably accessible through a public or protected database, but may alternately be accessible through an API or any other suitable means. Furthermore, the third party 220 may be limited to accessing only certain portions of the data, such as only the population data 390, only the vehicle trend data 370, only the data relating to motors, batteries, or vehicle operation, or only the data of vehicles located in a geographic location, wherein the remote processor sends the data in response to instructions 392 received from a third party processor.

The system 100 is preferably used to monitor and gather information about a vehicle and its components, such as an electric motorcycle or a hybrid automobile, but may additionally be used to monitor and gather information about any vehicle that incorporates a battery pack and/or an electric motor. The battery pack being monitored preferably includes a plurality of cells that cooperate to provide the battery pack with a desired power density, voltage potential, or any other suitable feature of a battery pack. Each of the plurality of cells is preferably of lithium-ion chemistry, such as lithium polymer, but may alternately be of nickel metal hydride chemistry, lead acid chemistry, or any other suitable battery cell chemistry. Each of the plurality of cells is preferably of a cylindrical geometry, but may alternatively be of a prismatic geometry, triangular geometry, or of any other suitable geometry. However, the battery pack may be of any other suitable arrangement. The electric motor being monitored functions to provide the vehicle with mechanical power, and is preferably a permanent magnet motor (such as a brushed DC motor or coreless DC motor) but may alternately be an AC motor or a universal motor.

The sensor 120 of the system 100 functions to measure an operation parameter. The sensor 120 is preferably coupled to a vehicle component of which an operation parameter is to be measured. In one example, a current sensor 120 and a voltage sensor 120 may be coupled to a battery cell or battery pack. In another example, a torque sensor 120 and a temperature sensor 120 may be coupled to the motor. The system 100 preferably includes a plurality of sensors 120 that measure different parameters, but may alternately include only one sensor 120. The sensors 120 preferably include current sensors 120, voltage sensors 120, impedance sensors 120, temperature sensors 120, location sensors 120 (e.g. GPS), and accelerometers, but may alternately include any other suitable sensor 120.

The module 140 of the system 100 functions to monitor and manage a sub-operation of the vehicle based on the operation parameter measurements 310 and pre-loaded logic. The module 140 also functions to process the operation parameter measurements 310 into module data 330, which the module 140 preferably uses to manage the vehicle sub-operation. The module 140 preferably processes the operation parameter measurements 310 into module data 330 by running a calculation or performing a comparison (e.g. between two operation parameters or between a measurement and a predetermined threshold or value), wherein the result of the calculation or comparison comprises the module data 330. The module 140 preferably manages the vehicle sub-operation based on the module data 330 by determining whether to change an operation parameter (e.g. increasing power output, decreasing power output, increasing torque, etc), but may manage the vehicle sub-operation in any suitable manner. Examples of modules 140 include a battery module 140 that manages the battery, a motor module 140 that manages the motor, a transmission module 140 that manages the transmission, a cooling module 140 that manages the cooling system 100, a suspension module 140 that manages the suspension, and a vehicle system 100 module 140 that monitors environmental aspects of the vehicle. Modules 140 of the system 100 preferably communicate with each other through the vehicle controller module 150.

The vehicle controller module 150 of the system 100 functions to process the module data 330 into vehicle data 350, and to manage the interaction between the modules 140 based on the vehicle data 350. The vehicle controller module 150 preferably processes the module data 330 into vehicle data 350 by running a calculation or performing a comparison (e.g. between several pieces of module data 330 from the same module 140 or between a piece of module data 330 and a predetermined value), wherein the result of the calculation or comparison comprises the vehicle data 350. However, the vehicle data 350 may alternately be a graph, table, plot, or any other suitable form of information that characterizes vehicle health, operation, or use. The vehicle controller module 150 preferably manages the interaction between modules 140 based on the vehicle data 350 (e.g. instructing the cooling module 140 to increase the coolant flow rate when the motor temperature reaches a predetermined value), but may alternately manage vehicle operation in any suitable manner. The vehicle controller module 150 is preferably a management program installed on the local processor, and is preferably coupled to, and manages, all the modules 140 of the system 100.

The data storage 160 of the system 100 functions to store data. As shown in FIG. 2, the system 100 preferably includes more than one data storage 160, wherein the sensors 120 store measurements 310 on one or more sensor data storages 162, the modules 140 store module data 330 on one or more module data storages 164, and the vehicle controller module 150 stores vehicle data 350 on vehicle data storage 166. In this embodiment, the sensors preferably write to the sensor data storage 162, the modules 140 preferably read from the sensor data storage 162 and/or the module data storage 164 and write to the module data storage 164, and the vehicle controller module 150 preferably reads from the module data storage 164 and/or the vehicle data storage 166 and writes to the vehicle data storage 166. Alternately, as shown in FIG. 1, the system 100 may only include one data storage 160 that stores all the measurements 310, module data 330, and vehicle data 350. The data stored on the data storage 160 preferably includes operation parameter measurements 310, module data 330, and vehicle data 350, but may alternately only include vehicle data 350 and module data 330, wherein the operation parameter measurements 310 are stored on smaller storage mediums that are localized with the sensor 120 of interest. The modules 140, the vehicle controller module 150, and the data extraction module 170 preferably read from the data storage 160, and the sensors 120, modules 140, and vehicle controller module 150 preferably write to the data storage 160. The data storage 160 is preferably located on a non-volatile data storage 160 medium, such as a disc drive or a flash drive. The data storage 160 preferably stores data for an extended period of time, on the order of hours, days, weeks, or months, but may alternately store data for short periods of time (e.g. several seconds or minutes). The data storage 160 preferably stores processed data for longer periods of time than less processed data—for example, the data storage 160 may store operation parameter measurements 310 for several seconds before it is deleted, but may store module data 330 for several weeks and vehicle data 350 for several months before it is deleted. More preferably, sensor data storage 162 preferably stores measurements 310 for a short period of time (on the order of seconds or minutes), the module data storage 164 preferably stores module data 330 for a moderate period of time (on the order of minutes or hours), and the vehicle data storage 166 preferably stores vehicle data 350 for an extended period of time (on the order of hours, days, weeks, or months).

The data extraction module 170 functions to receive extraction instructions 352 from the remote processor 200, extract information from the data storage 160, more preferably the vehicle data storage 166, based on the extraction instructions 352, and send the extracted information to the remote processor 200. The data extraction module 170 may additionally process the extracted information before it is sent, such as performing calculations or comparisons of the extracted data 354, or compressing the data using lossless or lossy compression algorithms. The data extraction module 170 is preferably a program installed on the same local processor as the vehicle controller module 150, but may alternately be a program installed on a second local processor. The data extraction module 170 is preferably a search program, but may alternately be a crawler program or any other suitable program that gleans information from the data storage 160. The data extraction module 170 preferably extracts information from the data storage 160 by accessing the data storage 160, searching the data storage 160 for the data desired by the remote processor 200, and identifying the desired data. While the data extraction module 170 preferably accesses only the vehicle data storage 166, the data extraction module 170 may additionally access the module data storage 164 and the sensor data storage 166. The data extraction module 170 may additionally store the desired data in temporary memory as part of the extraction process. The data extraction module 170 is preferably coupled to a transmitter and a receiver, such that it can send and receive data to and from the remote processor 200. The data extraction is preferably performed in response to extraction instructions 352 received from the remote server, but may alternately be performed according to preloaded instructions at a predetermined frequency or be performed according to previously received instructions, wherein the previously received instructions designate an extraction and sending frequency.

Figure 2A:
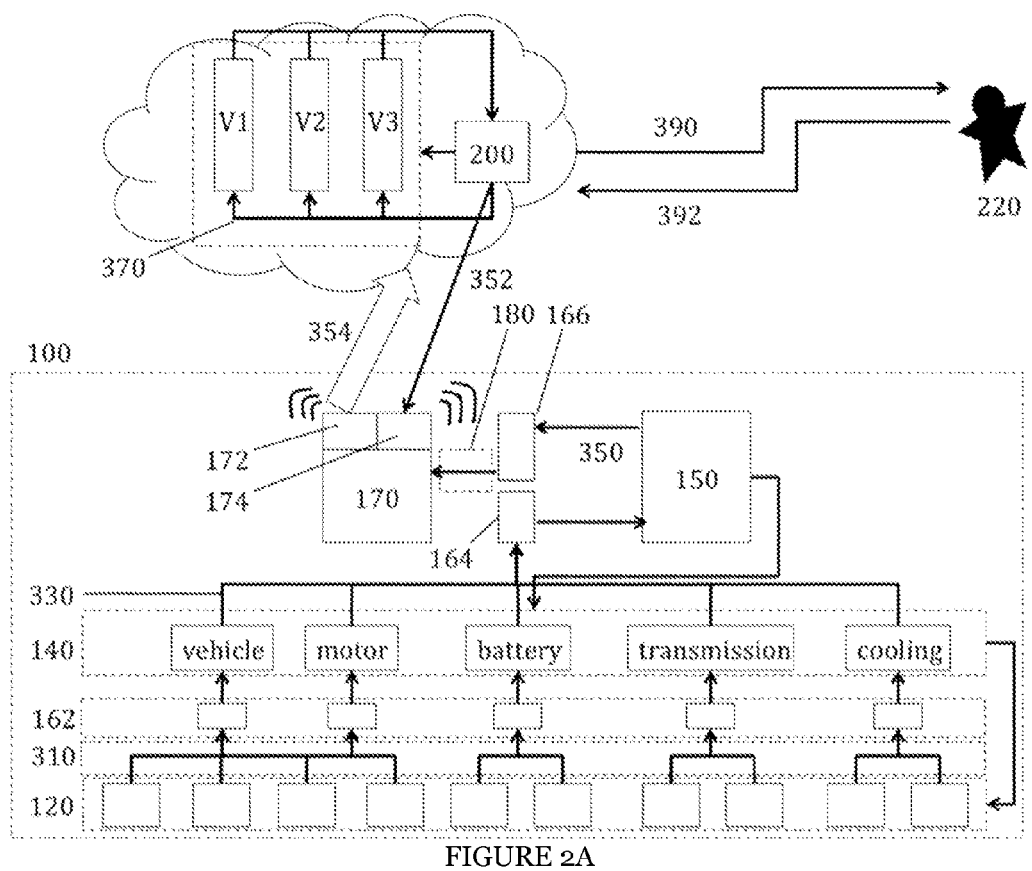
FIGS. 2A and 2B are schematic representations of a first and a second embodiment of the system, respectively.
Figure 2B:
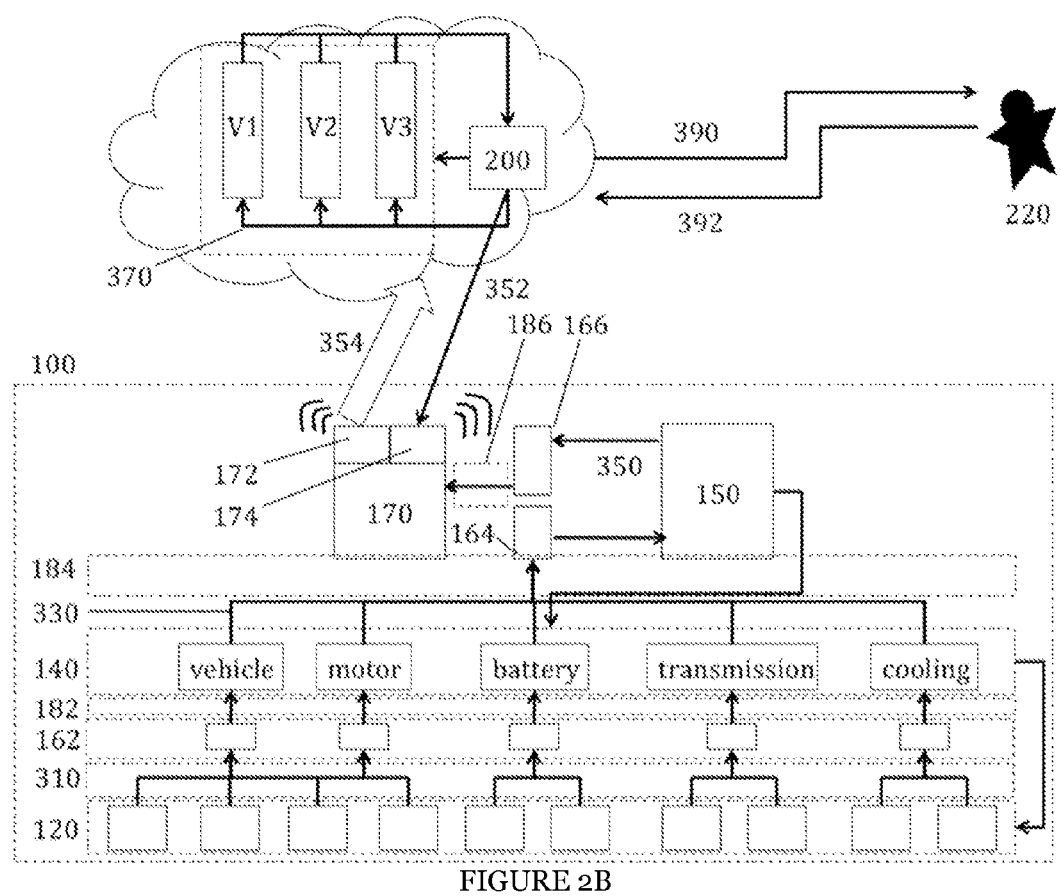

The isolation mechanism 180 functions to isolate the data extraction module 170 from the vehicle controller module 150, such that data extraction module 170 operations do not affect vehicle operation. As shown in FIG. 2A, the system preferably includes a single isolation mechanism 180 that isolates the vehicle controller module 150 from the data extraction module 170, but may alternately include multiple isolation mechanisms 180 (as shown in FIG. 2B), such as a sensor isolation mechanism 182, a module isolation mechanism 184, and a vehicle isolation mechanism 186, which function to isolate the sensors 120, the modules 140, and the vehicle controller module 150 from the data extraction module 170, respectively. The isolation mechanism 180 is preferably a logical partition, such as a partition in the processor, allowing read-only access of the data extraction module 170 to the data storage 160, allowing write-only access of the vehicle controller module 150 to the data storage 160, or sandboxing the data extraction module 170. However, the isolation mechanism 180 may alternately be a physical partition. For example, the data extraction module 170 may be located on a different processor than the vehicle controller module 150, and wherein the data extraction module 170 accesses the data storage 160 through a read-only cam bus.

The system 100 is preferably used in conjunction with the remote processor 200, is coupled to a server, and is located at a remote location. The remote processor 200 preferably monitors each vehicle independently, wherein the remote processor 200 receives extracted data 354 from the data extraction module 170 of a vehicle, processes the extracted data 354 into vehicle trend data 370 for the vehicle, determines desired data for the vehicle from the vehicle trend data 370, generates extraction information for the vehicle from the desired data, and sends the extraction information to the data extraction module 170 of the vehicle. The remote processor 200 preferably saves the vehicle trend data 370 on the server. The remote processor 200 preferably generates and sends a new set of extraction instructions 352 when a trigger event is met, but may alternately generate and send extraction instructions 352 periodically. The trigger event is any event of interest, such as the detection of abnormal battery operation, motor operation, vehicle operation, or cooling system operation.

Furthermore, the remote processor 200 is preferably connected to, and monitors, a population of multiple vehicle systems 100. The remote processor 200 preferably generates population data 390 from extracted data 354 received from multiple systems 100. More preferably, the remote processor 200 processes population data 390 from the vehicle trend data 370 generated for each of the multiple systems 100. The remote processor 200 also preferably generates and sends new extraction instructions 352 to individual vehicles or groups of vehicles based on analysis of the population data 390 or in response to instructions received from a third party 220.

Method for Monitoring a Plurality of Vehicles

Figure 3:
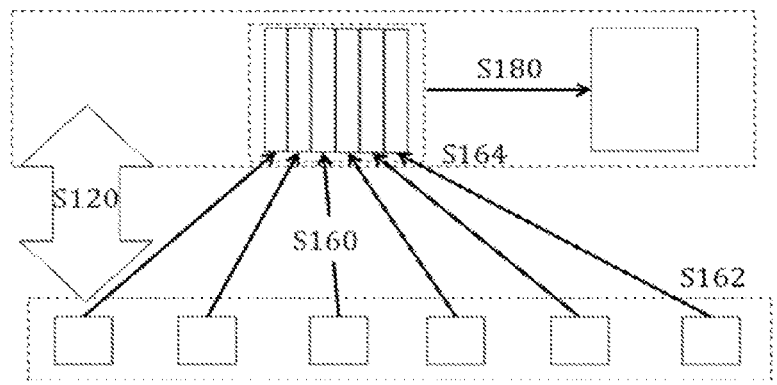
FIG. 3 is a schematic representation of the method of monitoring and gathering information from multiple vehicles.

As shown in FIG. 3, the method S100 for remotely monitoring and gathering information from a plurality of vehicles comprises the steps of accessing a plurality of vehicles S120, wherein each vehicle is individually operated; selecting vehicle data from the plurality of vehicles S140, communicating the vehicle data from the plurality of vehicles to a remote processor S160; and processing the plurality of vehicle data into population data by the remote processor S180. The method S100 is preferably used to monitor and gather information about a population of vehicles. The method S100 is preferably used with a population of vehicles that each include the system described above, but may alternately be used with any suitable vehicle or any suitable system. The method S100 is preferably performed by a remote processor, located remote from the vehicles. The remote processor is preferably coupled to a server that stores the vehicle data and population data.

Figure 4:
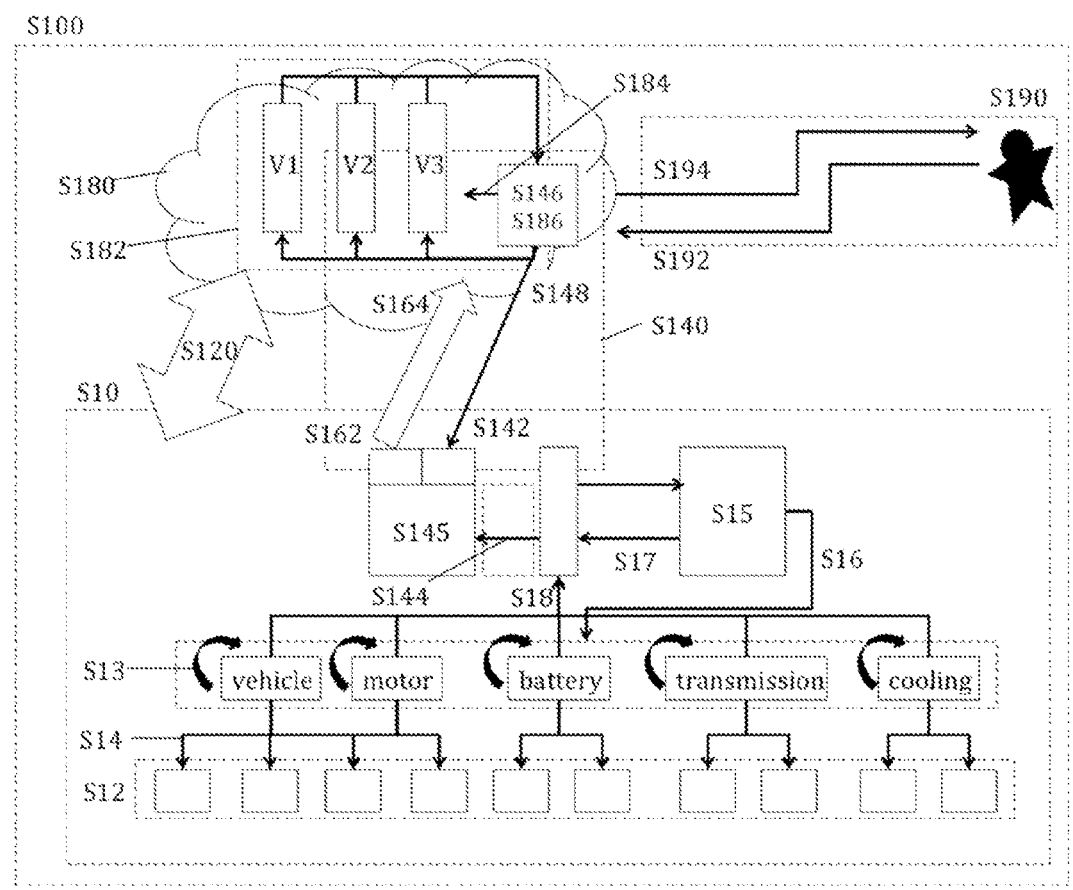
FIG. 4 is a schematic representation of the method of monitoring and gathering information from multiple vehicles, applied to an individual vehicle of the multiple vehicles.

As shown in FIG. 4, this method S100 is preferably utilized with vehicles that are independently operated, wherein operation of the vehicle S10 includes the steps of generating vehicle data S15, operating the vehicle based on the vehicle data with a vehicle controller S16, and storing the vehicle data in a database located on the vehicle S17. Each of these vehicles preferably include a vehicle controller coupled to an on-board data storage medium that stores the vehicle database, wherein the vehicle controller manages the interactions between modules that control vehicle sub-operations. The modules, in turn, may be coupled to sub-modules that assist the module in managing the vehicle sub-operation, wherein the modules and/or sub-modules are preferably coupled to sensors that measure operation parameters. The step of generating vehicle data S15 functions to generate data pertinent to the operation of the vehicle, module, or sub-module. The step of generating vehicle data S15 includes the step of processing module data into vehicle data through a calculation or comparison S15, wherein the step of processing module data into vehicle data includes the step of processing operation parameter measurements into module data through a calculation or comparison S13. The step of operating the vehicle based on the vehicle data with a vehicle controller S16 functions to maintain intended operation of the vehicle. The step of operating a vehicle based on vehicle data S16 further includes the steps of changing the operation of one module based on the module data of another S16. The step of operating a vehicle based on vehicle data S16 further includes the step of operating a module based on module data S14, wherein an operation parameter is changed in response to the module data. The step of storing the vehicle data in a vehicle database S17 functions to retain the generated vehicle data for an extended period of time. The step of storing vehicle data S17 may additionally include the step of storing module data in the database S18.

The step of accessing the plurality of vehicles S120 functions to establish a connection with each available vehicle of the population. While some vehicles may be inaccessible (e.g. the vehicle is turned off), this step S120 allows the remote processor to determine which vehicles it can extract vehicle data from. This step S120 is preferably initiated by pinging each of the vehicles associated with the remote server, but may alternately be initiated by receiving a signal from a vehicle. This step S120 is preferably accomplished by establishing a channel of communication with each available vehicle, preferably through a wireless connection but alternately through a wired connection.

The step of selecting vehicle data from the plurality of vehicles S140 functions to determine the data useful for remote vehicle analysis and monitoring. This step S140 is preferably performed by the remote processor in conjunction with the data extraction module located on each vehicle. The step of selecting vehicle data S140 preferably includes the steps of determining desired vehicle data for a vehicle by the remote processor S146; generating extraction instructions by the processor based on the desired vehicle data S186; sending the extraction instructions to the data extraction module S148; receiving the extraction instructions by the data extraction module S142, and extracting the desired vehicle data from the database by the data extraction module S144. While the step of extracting vehicle data S144 is preferably performed in response to the receipt of the extraction instructions S142, the step of extracting vehicle data S144 and/or the step of selecting vehicle data S140 may alternately be automatically performed by the data extraction module, wherein the data extraction module extracts and sends data to the remote processor based on preloaded extraction instructions. The step of selecting vehicle data S140 preferably further includes the steps of analyzing received vehicle data for a subset of vehicles in the population S146, then determining the desired data, wherein the desired data assists in the monitoring or analysis of the vehicle population. For example, upon receipt and determination of excessive cooling module use for a subset of vehicles operating in temperatures above 30° C., the remote processor may determine that it should extract cooling data for a subset of vehicles operating in temperatures below 20° C.

The step of communicating the vehicle data from the plurality of vehicles to a remote processor S160 functions to transfer select pieces of vehicle data (i.e. the desired data or the extracted data) to the remote processor. This step S160 is preferably accomplished wirelessly by a wireless transmitter coupled to each vehicle and a receiver coupled to the remote processor. However, this step S160 may be accomplished through a wired connection, such as a LAN connection. The step of communicating the vehicle data S160 may additionally include the step of processing the extracted data by the data extraction module S166 before it is sent to the processor. The outgoing data may be the result of a calculation or comparison of the extracted data, be encrypted extracted data, or simply be extraction data that is compressed by a compression algorithm.

The step of processing the plurality of vehicle data into population data S180 functions to summarize the vehicle data of the population, and functions to compare the operation, performance, and use of individual vehicles with those of the population. The step of processing the plurality of vehicle data into population data S180 preferably includes the application of a calculation or comparison to the vehicle data, wherein the result comprises the population data. Additionally, this step S180 preferably includes the step of processing the vehicle data into vehicle trend data for each vehicle S182, wherein the vehicle trend data summarizes the vehicle data for each vehicle. This step S180 also preferably includes the steps of processing the vehicle trend data into population data S184 and generating a new set of instructions based on the population data and analysis of said data S186, wherein the new set of instructions are preferably sent to a subset of vehicles, but may alternately be sent to a single vehicle or the entire population of vehicles. However, the population data may be generated directly from the vehicle data.

The method S100 also preferably includes the step of allowing third party access to the data, more preferably the step of allowing third party access to the population data S190. However, third parties may also access the vehicle data or vehicle trend data. This step S190 functions to allow component and vehicle engineers, designers, and maintenance personnel access to the data. The data is preferably used for development of future components and vehicles, but may additionally be used to determine vehicle and/or component maintenance, to analyze driving habits, or any other suitable application of the data. This step S190 is preferably accomplished through a client-server model (e.g. a password protected server that the third parties can remotely access), but may alternatively be accomplished through an API linked to the server, by peer-to-peer computing, or by placing the data in "the cloud" (e.g. in the case of cloud computing). This step S190 preferably includes the steps of receiving data request instructions from a third party processor S192 and sending the data requested to the third party S194.

As a person skilled in the art will recognize from the previous detailed description and from the figures and claims, modifications and changes can be made to the preferred embodiments of the invention without departing from the scope of this invention defined in the following claims.

We claim:

1. A method for remotely monitoring a plurality of individually operated vehicles, each vehicle comprising a first and second component controlled by a first and second component module, the method comprising the steps of:

at a vehicle:
generating first and second module data based on a first and second set of sensors configured to monitor first and second component operation, respectively;
controlling the first and second components based on the first and second module data with a first and second component module, respectively;
generating vehicle data based on the first and second module data;
controlling the first and second component module operation with a vehicle controller based on the vehicle data;
storing the vehicle data in a database located on the vehicle;
in response to receipt of a first set of extraction instructions by the first vehicle from a remote system, calculating desired data from vehicle data based on the first set of extraction instructions by the data extraction module of the first vehicle; and
sending the desired data to the remote system based on the extraction instructions;

at the remote system:
in response to receipt of the desired data, processing the desired data into vehicle operation trend data for the vehicle;
processing the vehicle operation trend data for the vehicle and secondary vehicle operation trend data for a secondary vehicle into population data;
analyzing the vehicle operation trend data for the vehicle based on the population data;
generating a second set of extraction instructions, different from the first set, for the vehicle based on the analysis; and
sending the second set of extraction instructions for the vehicle to the vehicle.

2. The method of claim 1, further comprising receiving vehicle data from a plurality of vehicles at the remote system and processing the plurality of vehicle data into population data, wherein the step of processing the plurality of vehicle data into population data by the remote system further includes the steps of processing vehicle data for each vehicle into vehicle trend data and processing the vehicle trend data into population data.

3. The method of claim 2, further comprising, at the remote system:
generating first and second set of extraction instructions for a first and second subset of vehicles of the plurality of vehicles, respectively, based on the population data, wherein the first set of extraction instructions for the first subset of vehicles is different from the second set of extraction instructions for the second subset of vehicles;
sending the first and second set of extraction instructions from the remote system to each of the first and second subset of vehicles, respectively; and
receiving desired data from each of the first and second subset of vehicles, the desired data calculated by a data extraction module of the vehicle from the respective vehicle data based on the first and second set of extraction instructions, respectively.

4. The method of claim 3, further comprising:
receiving vehicle data from the plurality of vehicles;
in response to the vehicle data from the first subset of vehicles surpassing a predetermined threshold, selecting the second subset of vehicles from the plurality of vehicles.

5. The method of claim 2, wherein the vehicle trend data comprises average battery health over time.

6. The method of claim 2, wherein the vehicle trend data comprises average motor power consumption across the plurality of vehicles.

7. The method of claim 2, wherein the vehicle trend data is the communicated vehicle data.

8. The method of claim 1, further including the step of allowing third party generation of extraction instructions.

9. The method of claim 8, wherein the step of allowing third party generation of extraction instructions includes allowing access of an API to the vehicle trend data.

10. The method of claim 1, wherein sending the sever data to a remote system includes the step of encrypting the vehicle data before the vehicle data is communicated.

11. The method of claim 1, wherein the step of communicating the vehicle data from the plurality of vehicles to a remote system is performed by a plurality of wireless transmitters, each coupled to a vehicle of the plurality of vehicles, and a wireless receiver coupled to the remote system.

12. The method of claim 1, wherein the data extraction module is isolated from the vehicle controller by having read-only access to the vehicle data.

13. The method of claim 1, further includes the steps of:
determining desired vehicle data for a first vehicle by the remote system;
generating extraction instructions for the first vehicle based on the desired vehicle data by the remote processor;
sending the extraction instructions by the remote system to the first vehicle; and,
receiving extraction instructions by the first vehicle;
wherein the step of extracting vehicle data from the vehicle database is performed by the data extraction module of the first vehicle, wherein the extracted vehicle data is based on the extraction instructions.

14. The method of claim 13, wherein the remote processor determines the desired vehicle data for each vehicle of the plurality of vehicles, generates extraction instructions for each vehicle of the plurality of vehicles, and sends the extraction instructions for each vehicle to each vehicle of the plurality of vehicles.

15. The method of claim 13, wherein the desired vehicle data includes a desired vehicle data set and a desired vehicle data amount.

16. The method of claim 15, wherein the desired vehicle data is determined from the vehicle data of the first vehicle communicated to the remote processor.

17. The method of claim 16, wherein the remote processor monitors the communicated vehicle data for a trigger event, and determines a second desired vehicle data when the trigger event is met.

18. The method of claim 17, wherein the vehicle data communicated to the remote processor comprises a value, wherein the trigger event is the determination of proximity of the value to a predetermined operational threshold.

19. The method of claim 15, wherein the desired vehicle data is at least one of the group consisting of: battery data, motor data, location data, transmission data, and cooling data.

20. The method of claim 15, wherein the extraction instructions further include processing steps to be applied to the vehicle data, wherein the step of communicating vehicle data to the remote processor further includes the step of processing the vehicle data before it is communicated to the remote processor by the data extraction module.

21. The method of claim 1, wherein the database is stored on non-volatile memory located on the vehicle.

22. The method of claim 1, wherein the step of processing the module data into vehicle data includes calculating the vehicle data from the module data.

23. The method of claim 1, controlling the first and second component module operation based on the vehicle data with the vehicle controller includes changing the operation of the first module based on vehicle data generated from the second module data of the second module by the vehicle controller.

24. The method of claim 23, wherein the first module includes a battery module that controls battery operations, and the second module includes a motor module that controls motor operations.

25. The method of claim 1, wherein the step of generating the first and second module data further includes the steps of measuring a series of operation parameter measurements of the component, storing the series of operation parameter measurements, and processing the series of operation parameter measurements into module data.

26. The method of claim 25, wherein the operation parameter measurements are performed by a sensor.

27. The method of claim 26, wherein the sensor is one of the group consisting of: an impedance sensor, a voltage sensor, and a current sensor.

28. The method of claim 26, wherein the sensor is a GPS sensor.

* * * * *